No. 776,885. Patented December 6, 1904.

UNITED STATES PATENT OFFICE.

MELCHIOR BÖNIGER, OF BASLE, SWITZERLAND, ASSIGNOR TO CHEMICAL WORKS FORMERLY SANDOZ, OF BASLE, SWITZERLAND, A CORPORATION.

GREEN SULFUR DYE AND PROCESS OF MAKING SAME.

SPECIFICATION forming part of Letters Patent No. 776,885, dated December 6, 1904.

Application filed September 8, 1904. Serial No. 223,737. (No specimens.)

*To all whom it may concern:*

Be it known that I, MELCHIOR BÖNIGER, doctor of philosophy, residing at 60 Fabrikstrasse, Basle, Switzerland, have invented new and useful Improvements in Green Sulfur Dyes and Processes of Making Same, of which the following is a specification.

In the United States Letters Patent No. 675,585 I have described dark-blue sulfur dyes deriving from paraoxyphenyl 1-4 nitronaphthylamin sulfonic acids. The same starting materials at higher temperatures yield more green-black coloring-matters. The formation of these green-black coloring-matters, even at moderate heat, can never be entirely avoided, and they are in this way objectionable by-products in the manufacture of blue dyes. Similar observations have been made in using the paraoxyphenyl 1-4 naphthylenediamin sulfonic acids. In order to avoid further condensation in the free amido group of the aforesaid starting materials, I endeavored to block the same by substitution with an aryl group, and hereby I have discovered that the aryl 1-paraoxyaryl-4 naphthylenediamin sulfonic acids of the general formula

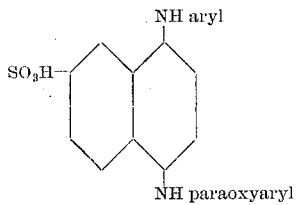

yield green sulfur colors instead of the expected blue colors. If the melt with alkali polysulfids is made in presence of copper or copper salts, even bright yellowish-green sulfur dyes possessing extraordinary fastness to light and washing are obtained. The 1-4 naphthylenediamin sulfonic acids, which are especially suitable for this process, are the leuco derivatives of indophenols, which can be readily obtained by simultaneous oxidation of phenyl- or tolyl-1 naphthylamin 5-, 6-, 7-, or 8-monosulfonic acids and p-amido phenol or chloro-p-amidophenol in molecular proportions. Naturally the indophenol bodies themselves can also be directly employed, being reduced by the polysulfid in the process to the corresponding leuco derivatives.

In carrying out my invention practically I can proceed as follows:

Example I: Forty kilos of p-tolyl-1-p-oxyphenyl-4-naphthylenediamin-8-sulfonic acid are introduced into a boiling solution of forty kilos of sulfur and one hundred kilos of crystallized sodium sulfid in one hundred liters of water. The brownish-yellow solution so obtained is now concentrated to a boiling-point of 120° centigrade and maintained thereat, using the reflux condenser for about twenty hours, stirring well at the time. The melt is then dissolved in hot water and the dyestuff precipitated by addition of common salt. When dried, it forms a dark powder with a bronze luster, readily soluble with a bluish-green coloration in water, giving in strong sulfuric acid a steel-blue solution, from which the dyestuff is precipitated in dark-blue flakes by dilution with water. From a salt-bath containing sodium sulfid the new coloring-matter dyes unmordanted cotton directly in slate-green shades, oxidizing in the air to a bright bluish-green.

Example II: To a solution of forty kilos of sulfur and one hundred kilos of crystallized sodium sulfid in one hundred liters of water at the boil slowly add forty kilos of phenyl 1-p-oxyphenyl-4-naphthylenediamin-6 or 7-mono sulfonic acid (deriving from phenylated alpha-naphthylamin sulfonic acid (Cleve) and introduce into the yellowish paste thus obtained five kilos of copper powder, obtained by precipitation of blue-stone with zinc-dust, or seven kilos of blue-stone or the corresponding quantity of another copper salt. Concentrate to a boiling-point of 115° centigrade and maintain thereat during fifteen to twenty hours, using the reflux condenser, stirring well during the whole process. Dissolve the melt in boiling water and after filtration precipitate the dyestuff from the yellow-green solution by addition of common salt, filter, and dry. A dark-bronze powder is thereby obtained, dissolving in water to form a yellowish-green solution, which can be decolored at the boil by addition of sodium sulfid to a pale brownish-yellow solution, dyeing unmordanted cotton directly in grayish-green shades, which develop in the air to a bright yellow-green, fast to alkalies, acids, washing, and light.

In the same way other coloring-matters of this series can be obtained, and it is to be distinctly understood that this invention is in no way limited to the proportions or the temperatures mentioned in the foregoing examples. Further, the process may be carried out in alcoholic solution or in presence of glycerin.

The new green sulfur dyes are characterized by the following general properties: They dissolve in water with blue-green to yellow-green coloration. On addition of acids the dyestuff is precipitated in greenish-blue to green flakes, caustic alkalies in excess producing a blue precipitate. With strong sulfuric acid they give a steel-blue solution, from which the dyestuff is deposited in blue flakes on dilution with water.

Now what I claim, and desire to secure by Letters Patent, is the following:

1. The process for the manufacture of new green sulfur dyes by treating aryl 1.paraoxyaryl 4 naphthylenediamin sulfonic acids with alkali polysulfids, substantially as set forth.

2. The process for the manufacture of new green sulfur dyes by treating aryl 1.paraoxyaryl 4 naphthylenediamin sulfonic acids with alkali polysulfids in the presence of copper or copper salt, substantially as set forth.

3. The herein-described green sulfur dyes deriving from aryl 1 paraoxyaryl 4 naphthylenediamin sulfonic acids, dissolving in water with blue-green to yellowish-green, in concentrated sulfuric acid with steel-blue coloration, being precipitated by diluted acids in blue flakes, caustic alkalies in excess producing a blue precipitate, substantially as set forth.

In testimony that I claim the foregoing as my invention I have signed my name, in presence of two witnesses, this 26th day of August, 1904.

MELCHIOR BÖNIGER.

Witnesses:
GEO. GIFFORD,
ARNOLD STEINER.